United States Patent
Choi et al.

(10) Patent No.: US 8,269,938 B2
(45) Date of Patent: Sep. 18, 2012

(54) FRINGE FIELD SWITCHING MODE LIQUID CRYSTAL DISPLAY DEVICE AND FABRICATION METHOD THEREOF

(75) Inventors: Seung Chan Choi, Gyeongsan-si (KR); Hyun Kyu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 421 days.

(21) Appl. No.: 11/454,866

(22) Filed: Jun. 19, 2006

(65) Prior Publication Data

US 2006/0290866 A1    Dec. 28, 2006

(30) Foreign Application Priority Data

Jun. 28, 2005    (KR) .................. 10-2005-0056046

(51) Int. Cl.
  G02F 1/136    (2006.01)
  G02F 1/1343   (2006.01)
  G02F 1/13     (2006.01)
  H01L 21/00    (2006.01)
  H01L 31/00    (2006.01)
  H01L 27/14    (2006.01)
  H01L 29/04    (2006.01)
  H01L 29/15    (2006.01)
  H01L 31/036   (2006.01)

(52) U.S. Cl. .......... 349/147; 349/46; 349/141; 349/144; 349/187; 438/30; 257/59; 257/72

(58) Field of Classification Search ............ 349/46, 349/139, 141, 144, 147, 187; 438/30; 257/59, 257/72
  See application file for complete search history.

(56) References Cited

U.S. PATENT DOCUMENTS

| | | | |
|---|---|---|---|
| 6,157,430 A * | 12/2000 | Kubota et al. | 349/147 |
| 6,388,726 B1 * | 5/2002 | Kim et al. | 349/141 |
| 6,589,825 B2 * | 7/2003 | Kim | 438/151 |
| 6,646,707 B2 * | 11/2003 | Noh et al. | 349/141 |
| 7,115,906 B2 * | 10/2006 | Lai | 257/72 |
| 7,196,352 B2 * | 3/2007 | Hung et al. | 257/59 |
| 7,248,323 B2 * | 7/2007 | Ahn et al. | 349/141 |
| 7,561,235 B2 * | 7/2009 | Ono | 349/141 |
| 2004/0126917 A1 * | 7/2004 | Yoo et al. | 438/30 |
| 2004/0126950 A1 * | 7/2004 | Kim et al. | 438/197 |
| 2004/0189919 A1 * | 9/2004 | Ahn et al. | 349/141 |
| 2004/0207784 A1 * | 10/2004 | Lim et al. | 349/114 |
| 2005/0242347 A1 * | 11/2005 | Lai | 257/59 |
| 2005/0243255 A1 * | 11/2005 | Ono | 349/141 |
| 2006/0290865 A1 * | 12/2006 | Choi et al. | 349/141 |

* cited by examiner

*Primary Examiner* — Mark Robinson
*Assistant Examiner* — Paisley L Arendt
(74) *Attorney, Agent, or Firm* — McKenna Long & Aldridge LLP

(57) ABSTRACT

An FFS mode LCD and a fabrication method thereof are provided. The fabrication method comprises: etching a common electrode material and a gate metal on a board at the same time through a first mask process; forming a gate insulating layer, an active layer and a source/drain metal on the board; forming a channel in a TFT part, forming an opening in the pixel area part by diffraction exposure and exposing a gate pad part through a second mask process; forming a passivation layer substantially on board, and forming a contact hole in TFT part, etching regions in pixel area part and exposing a gate pad and a data pad part through a third mask process; and forming a pixel electrode on regions of the TFT, pixel area part and opened regions of the gate pad and data pad part through a fourth mask process.

8 Claims, 27 Drawing Sheets

FRINGE FIELD SWITCHING MODE LIQUID CRYSTAL DISPLAY DEVICE AND FABRICATION METHOD THEREOF

This application claims the benefit of Korean Patent Application No. 2005-56046, filed on Jun. 28, 2005, which is hereby incorporated by reference for all purposes as if fully set forth herein.

BACKGROUND OF THE INVENTION

1. Field of the Invention

The present invention relates to a fringe field switching (FFS) mode liquid crystal display device (LCD), and a method of manufacturing a fringe field switching (FFS) mode LCD that reduces the number of mask processes using a diffraction exposure.

2. Discussion of the Related Art

Many researches are actively developing a light and slim display device having a large-size screen, low power consumption, and of low cost. LCDs are favored as display devices that satisfy such requirements.

LCDs provide a higher resolution than other flat panel display devices and have rapid response characteristics resulting in high quality images similar to a cathode-ray tube (CRT) when reproducing a moving picture.

An LCD may include a color filter substrate having a common electrode material, an array substrate having a pixel electrode and liquid crystal filling a gap between the color filter and array substrates. Alternatively, a substrate may also include a board. A twisted nematic (TN) mode LCD may be used in active matrix LCDs. The TN mode LCD includes two substrates each having an electrode and a liquid crystal director twisted at 90 degrees. The TN mode LCD twists the liquid crystal director in part by supplying voltage to the electrodes.

However, the TN mode LCD is disadvantageous because of its narrow viewing angle.

In order to overcome such a disadvantage with the TN mode LCD, many researches are actively developing a new mode of LCD. Recently, an In-Plane Switching (IPS) mode LCD and a Fringe Field Switching (FFS) mode LCD have been developed.

Particularly, the FFS mode LCD provides a wide viewing angle with high permeability characteristics which differs from the IPS mode LCD.

In an FFS mode LCD, a fringe field is formed above a transparent common electrode material and a transparent pixel electrode by arranging the distance between the common electrode material and the pixel electrode shorter than a distance between a top and bottom substrate so that the liquid crystal molecules are driven above the electrodes.

FIG. 1A is a plan view of a unit pixel of an FFS mode LCD according to the related art, and FIG. 1B is a cross-sectional view of FIG. 1A taken along a line I-I'.

As shown in FIGS. 1A and 1B, a unit pixel is defined by intersecting gate lines 2 and data lines 4 on a bottom substrate and a thin film transistor (TFT) is disposed at a crossing of the gate line 2 and the data line 4.

A common electrode material 5 may be made of a transparent conductive material. The common electrode material 5 is formed at each unit pixel and may have a rectangular shape. The common electrode material 5 is connected to a common signal line 7 to constantly receive a common signal.

Also, a pixel electrode 8 is formed at the unit pixel to be overlapped with the common electrode material 5 and an insulating layer (not shown) is interposed between the overlapped the electrodes.

The pixel electrode 8 may be formed in a plate shape and may include a plurality of slits 8a to expose a predetermined portion of the common electrode material 5.

Although not shown in the drawings, the top and bottom substrates face one another and are separated at a distance greater than a distance between the pixel electrode 8 and the common electrode material 5. Liquid crystal is injected between the top and bottom substrates.

Recently, a new electrode structure that prevents color shift by forming a predetermined pattern at a transparent electrode layer of an FFS mode LCD has been introduced.

That is, a dual domain is formed on a unit pixel as shown in FIG. 1A. The dual domain is formed by diagonally forming two groups of a plurality of slits 8a with a uniform gap, where one group of the slits is symmetric with other group of slits.

FIGS. 2A through 2F are plan views for describing a method of fabricating an FFS mode LCD according to the related art.

As shown in FIG. 2A, a rectangular plate shaped common electrode material is formed on a substrate through a first mask process. Then, a second mask process is performed to form the gate line and the common line as shown in FIG. 2B.

After forming the gate line and the common line, a third mask process is performed to form an active region as shown in FIG. 2C and a fourth mask process is performed to form the data line, a source electrode and a drain electrode as shown in FIG. 2D. Then, a fifth mask process is performed to form a contact hole as shown in FIG. 2E and a sixth mask process is performed to form a pixel electrode as shown in FIG. 2F. That is, the FFS mode LCD is fabricated through at least six mask processes as shown in FIGS. 2A through 2F.

Since numerous masks are needed to fabricate the FFS mode LCD according to the related art, fabricating time and manufacturing cost both increase.

In order to overcome the disadvantages of the related art fabrication method, a diffraction exposure was introduced. The diffraction exposure allows a common electrode material, a gate line and a common signal line to be formed through one mask process. However, it is very difficult to maintain exposure uniformity and photo-resist ashing uniformity on diffraction-exposed regions because diffraction-exposed regions of the gate metal and the common electrode material metal face one another.

SUMMARY OF THE INVENTION

Accordingly, the present invention is directed to a fringe field switching mode liquid crystal display device and fabrication method thereof that substantially obviates one or more of the problems due to limitations and disadvantages of the related art.

An advantage of the present invention is to provide a fringe field switching mode liquid crystal display device and a fabrication method thereof for reducing the number of mask processes by selectively removing a gate metal, an active layer and a source/drain region through openings using a diffraction exposure while forming a source electrode and a drain electrode.

Additional features and advantages of the invention will be set forth in the description which follows, and in part will be apparent from the description, or may be learned from practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of fabricating a fringe field switching mode liquid crystal display device comprising: forming a common electrode material and a gate metal on a board in sequence; etching the common electrode material and the gate metal at the same time through a first mask process; forming a gate insulating layer, an active layer and a source/drain metal on the board in sequence; forming a channel in a thin-film transistor (TFT) part, forming an opening that exposes a common electrode material in the pixel area part through a diffraction exposure and exposing a gate pad part by performing a second mask process; forming a passivation layer on substantially the entire surface of the board, and forming a contact hole on a drain electrode of the TFT part, etching predetermined regions of the source/drain metal and an active layer substantially remaining at the center of the pixel area part and opening a gate pad part and a data pad part through a third mask process; and forming a pixel electrode on a predetermined region contacting the drain electrode in the TFT part, a predetermined region having the opening in the pixel area part and opened regions of the gate pad part and the data pad part through a fourth mask process.

In another aspect of the present invention, there is provided a fringe field switching (FFS) mode LCD comprising: a unit pixel defined by crossing a gate line and a data line on a first board; a common electrode material and a pixel electrode for forming a fringe field; a color filter and a black matrix formed on a second board; a liquid crystal layer interposed between the first and the second boards; and a common signal line substantially on a center of the unit pixel to contact the common electrode material for constantly receiving a common signal, wherein the common electrode material has a predetermined portion substantially bent toward the side of the unit pixel on both sides of the common signal line region.

In a further aspect of the present invention, there is provided a method of fabricating a fringe field switching (FFS) mode LCD, the method comprising: forming a common electrode material, a gate metal and a first gate insulating layer on a board in sequence; etching the common electrode material, the gate metal and the gate insulating layer through a first mask process; forming a second gate insulating layer, an active layer and a source/drain metal on the board in sequence; forming a channel in a thin-film transistor (TFT) part, forming an opening to expose a common electrode material in a pixel area part by performing a diffraction exposure process and opening a gate pad part through a second mask process; forming a passivation layer substantially on the board, forming a contact hole on a drain electrode of the TFT part and etching a predetermined region of a source/drain metal and an active layer which remain substantially at the center of the pixel area part through a third mask process; and forming a pixel electrode on the entire surface of the board, and forming a pixel electrode at a predetermined region of the TFT part that contacts a drain electrode of the TFT part, a predetermined region of the pixel area part having an opening and opened regions of the gate pad part and the data pad part through a fourth mask process.

In a still further aspect of the present invention, there is provided a method of fabricating a fringe field switching (FFS) mode LCD, the method comprising: forming a common electrode material and a gate metal on a board in sequence; etching the common electrode material, the gate metal and a gate insulating layer through a first mask process; forming a gate insulating layer, an active layer and a source/drain metal on the board in sequence; forming a channel in a thin-film transistor (TFT) part, forming an opening to expose a common electrode material in a pixel area part by performing a diffraction exposure process and opening a gate pad part through a second mask process; forming a passivation layer substantially on the board, exposing a drain electrode of the TFT part, etching a predetermined region of a source/drain metal and an active layer in the pixel area part, and forming a contact hole that exposes a gate pad part and a data pad part through a third mask process; and forming a pixel electrode on the entire surface of the board, and patterning a pixel electrode in the pixel area part, the gate pad part and the data pad part through a fourth mask process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings. Wherever possible, the same reference numbers will be used throughout the drawings to refer to the same or like parts.

FIGS. 3A through 3D are cross-sectional views for describing a method of fabricating an FFS mode LCD according to an embodiment of the present invention, and FIGS. 4A through 4D show mask patterns used for the mask processes illustrated in FIGS. 3A through 3D.

Figure 1A:
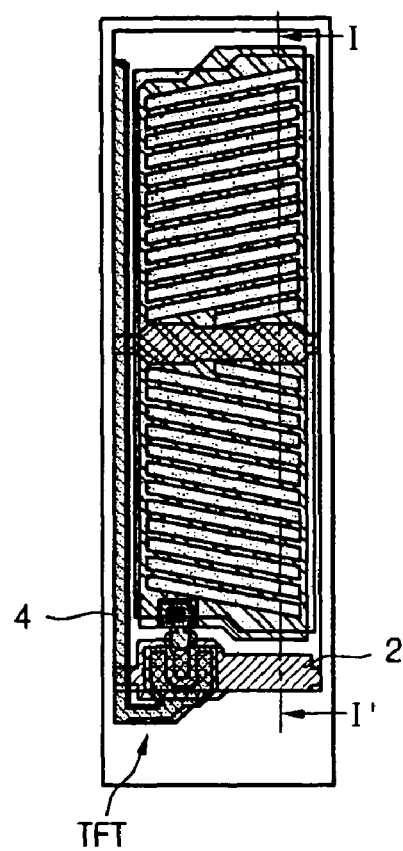
FIGS. 1A and 1B are a plan view of a unit pixel of an FFS mode LCD and a cross-sectional view of the unit pixel taken along a line I-I' according to the related art.
Figure 1B:
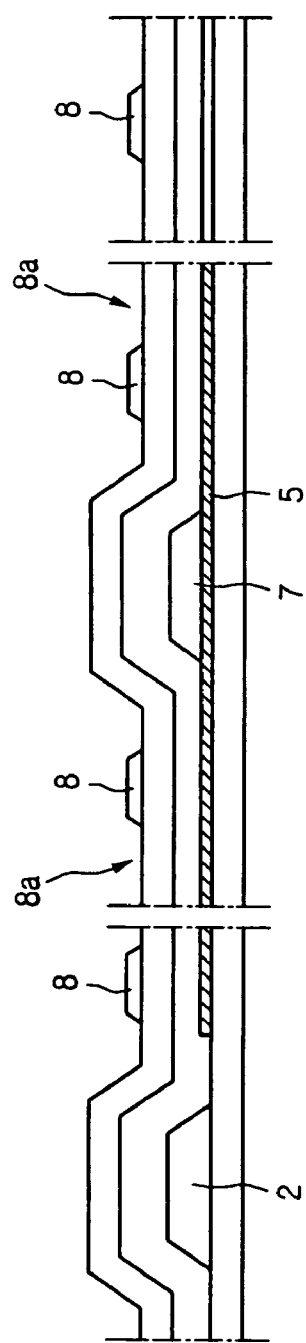
Figure 2A:
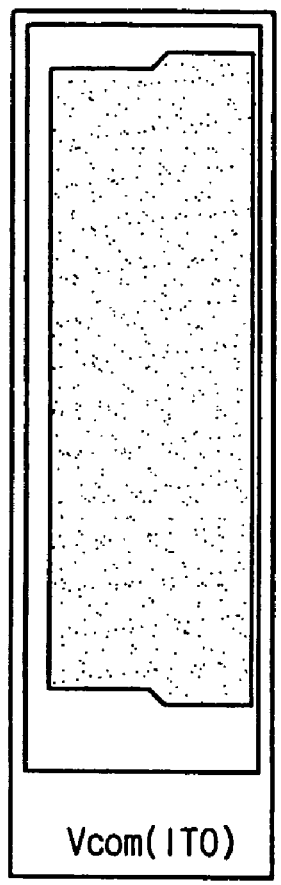
FIGS. 2A through 2F are plan views for describing a method of fabricating the FFS mode LCD of FIGS. 1A and 1B according to the related art.
Figure 2B:
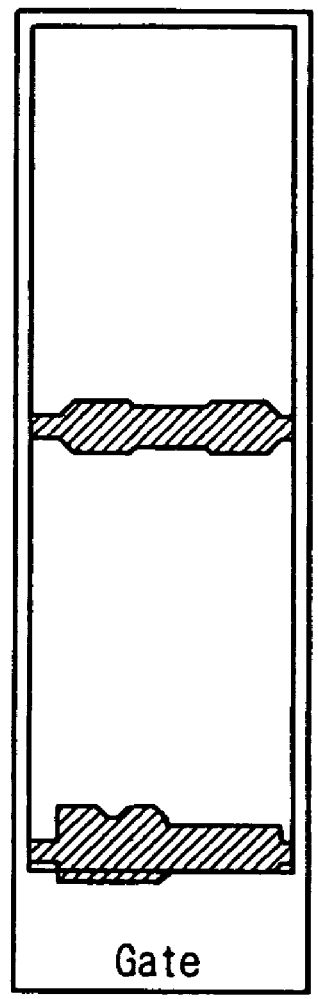
Figure 2C:
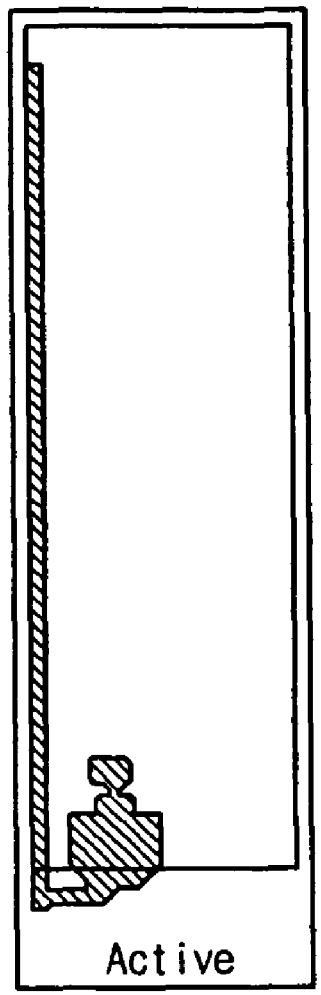
Figure 2D:
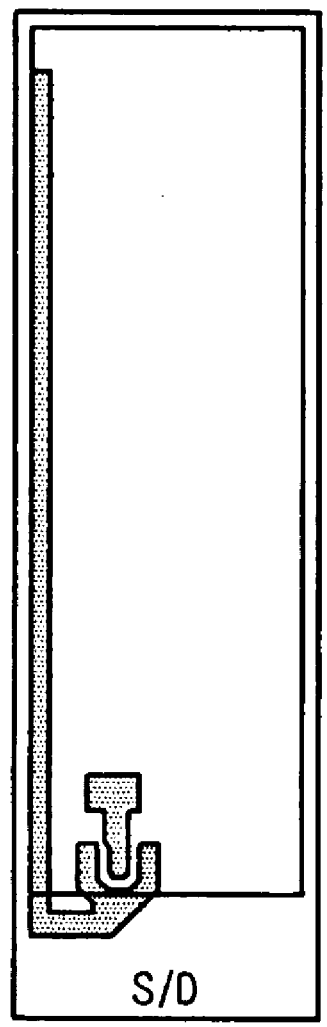
Figure 2E:
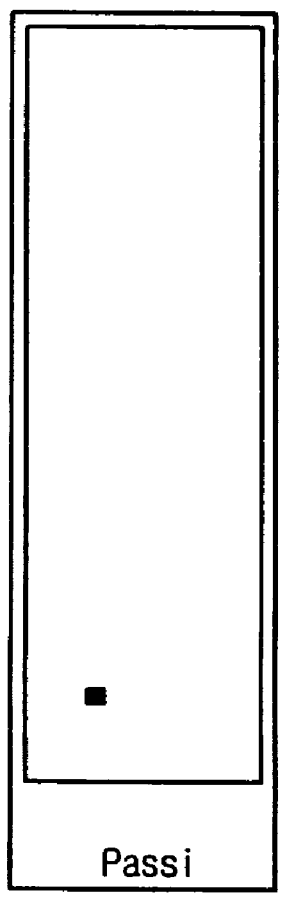
Figure 2F:
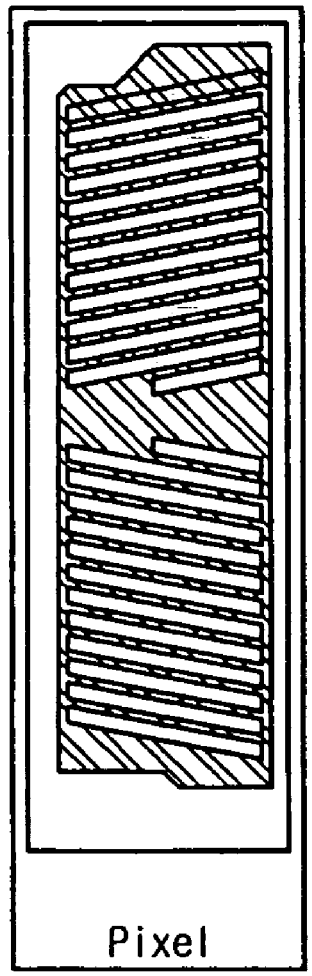
Figure 3A:
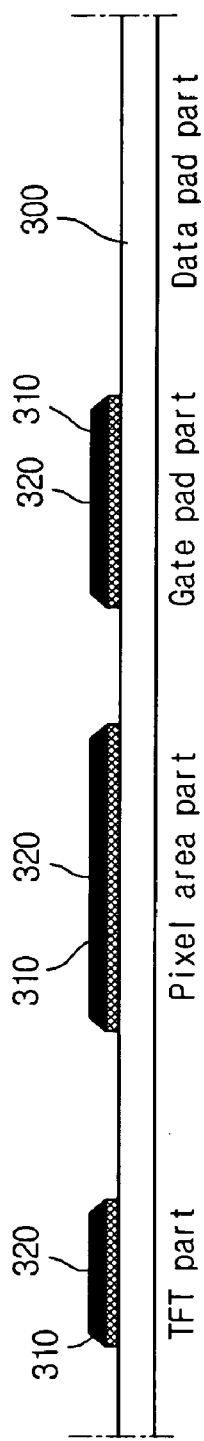
FIGS. 3A through 3D are cross-sectional views for describing a method of fabricating an FFS mode LCD according to an embodiment of the present invention.
Figure 4A:
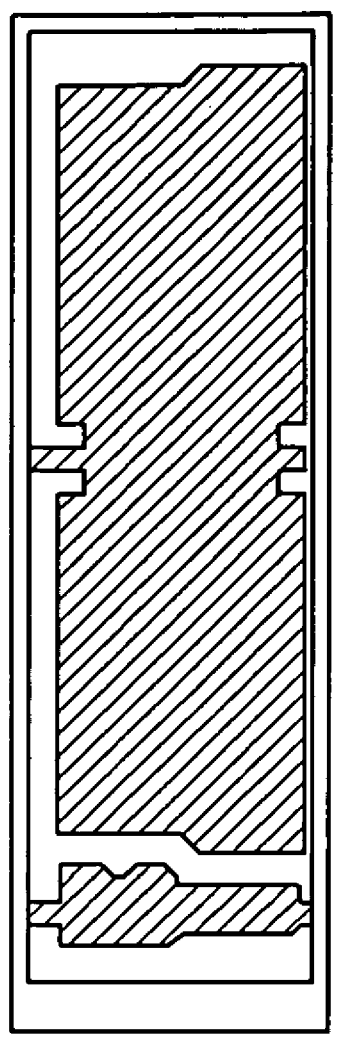
FIGS. 4A through 4D show mask patterns used for the mask processes illustrated in FIGS. 3A through 3D.
Figure 4B:
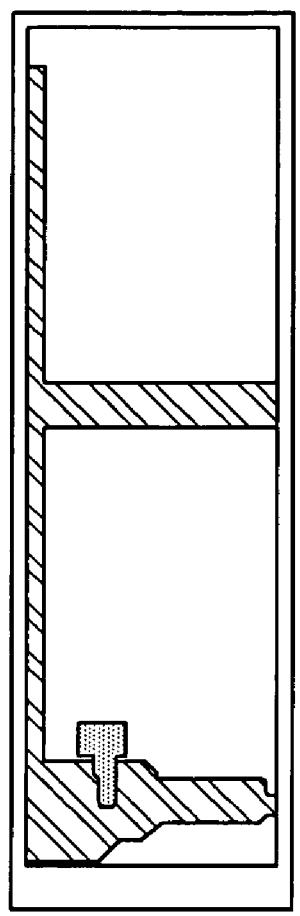

As shown in FIG. 3A, a common electrode material 310 and a gate metal 320 are sequentially deposited on a board 300. Then, the common electrode material 310 and the gate metal 320 are simultaneously etched through a photolithography process using a first mask having a pattern substantially as shown in FIG. 4A.

As a result, the common electrode material 310 and the gate metal 320 are substantially stacked on a TFT part, a pixel area part and a gate pad part as shown in FIG. 3A.

The gate metal 320 formed on the TFT part may function as a gate line and a gate electrode, the gate metal 320 formed on the pixel area part may function as a common signal line, and the gate metal 320 formed on the gate pad part may function as a bottom electrode of a gate pad.

The common electrode material metal 310 may be formed of a transparent material such as ITO and substantially rectangularly shaped in the pixel area part.

Figure 3B:
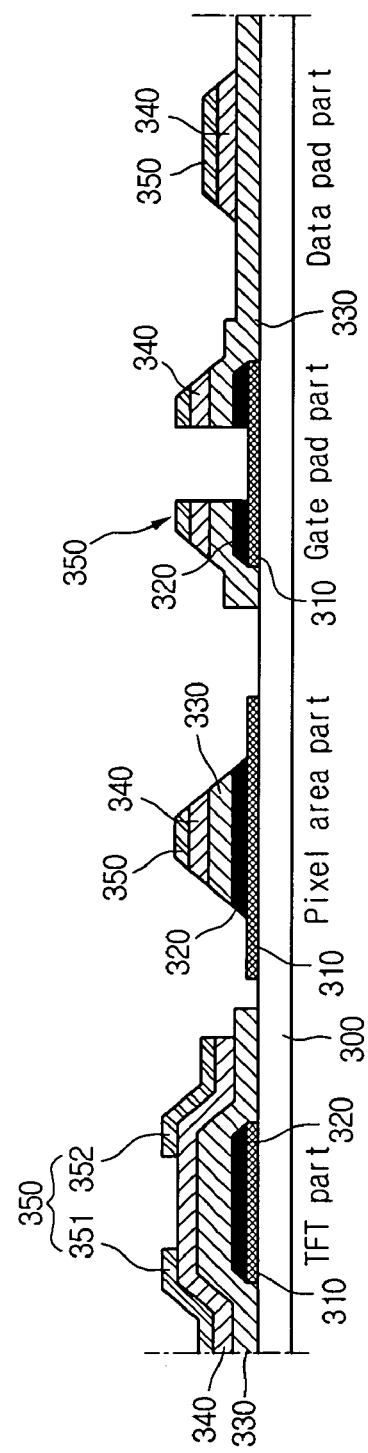

As shown in FIG. 3B, a gate insulating layer 330, an active layer 340 and a source/drain metal 350 are sequentially deposited on the board 300. Then, a channel is formed on the TFT part, a gate metal 320 is substantially removed from an opened region of the gate pad part and a gate pad is opened through a photolithography process using a second mask shown in FIG. 4B.

Also, a gate insulating layer 330, an active layer 340 and a source/drain metal 350 are sequentially stacked on the data pad part.

A diffraction exposure is performed in the second mask process according to the present embodiment. The fabrication method according to an embodiment of the present invention is characterized by performing the diffraction exposure on a channel forming area in the TFT part and a common signal line forming area in the pixel area part.

As shown in FIG. 3B, the diffraction exposure process exposes the active layer 340 in the TFT part and separates a source electrode 351 and a drain electrode 352 in the TFT part to form the channel in the TFT part. Also, the gate metal 320 substantially formed on the center of the pixel area part is not etched so the remaining gate metal 320 operates as a common signal line which is a patterned gate metal.

That is, the diffraction exposure process forms an opening on the pixel area for a common electrode material, and leaves the gate insulating layer 330, the active layer 340 and the source/drain metal 350 on the gate metal 320 that operates as a common signal line.

Herein, the gate metal exposed through the opening is substantially etched using the source/drain metal 350 as a mask according to an embodiment of the present invention.

As shown in FIG. 3B, center portions of the source/drain electrode 350, the active layer 340, the gate insulating layer 330 and the gate metal 320 stacked on the gate pad part are etched to expose the common electrode material 310 which is the lowest layer in the gate pad part.

Figure 3C:
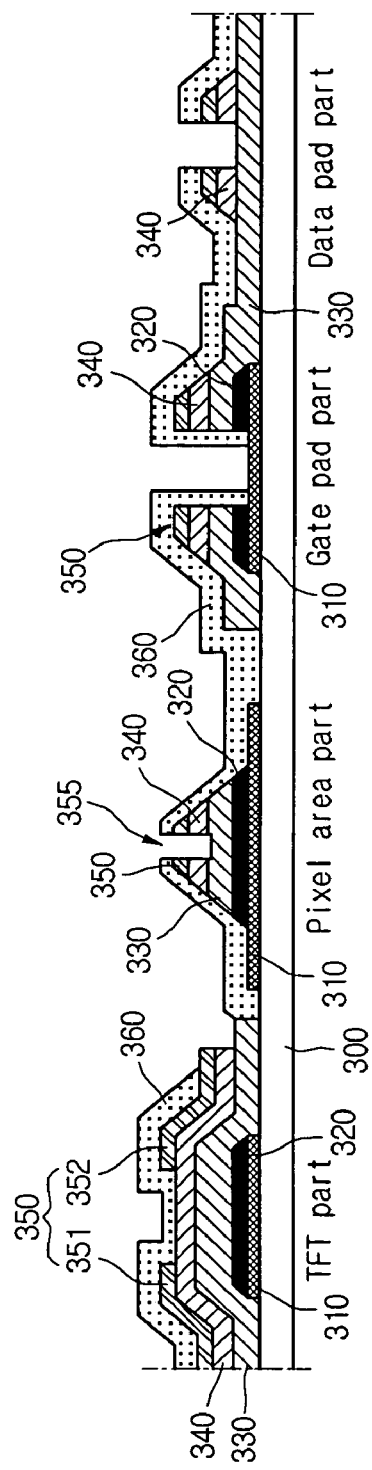

As shown in FIG. 3C, a passivation layer 360 is deposited on substantially the entire surface of the board 300. Then, a photolithography process is performed using a third mask shown in FIG. 4C to form a contact hole on the drain electrode 352 of the TFT part and to etch a predetermined region 355 of the source/drain metal 350 and the active layer 340 which substantially remain on the center of the pixel area part. Also, predetermined regions of the gate pad part and the data pad part are opened.

Figure 4C:
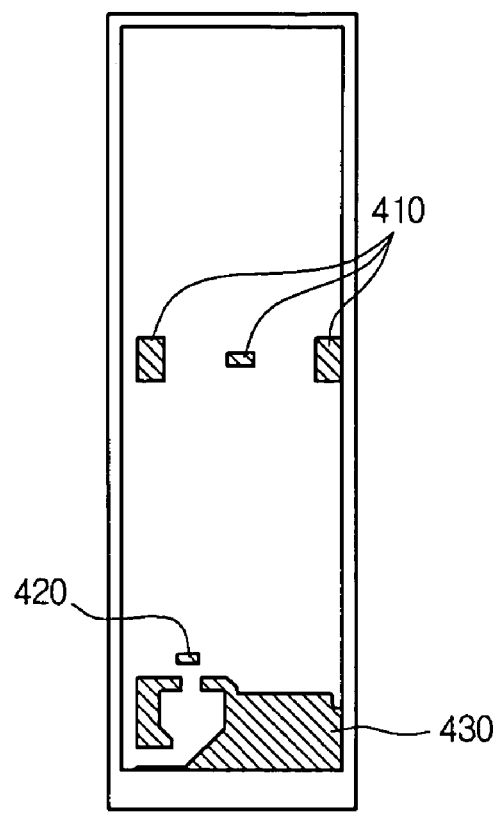
Figure 4D:
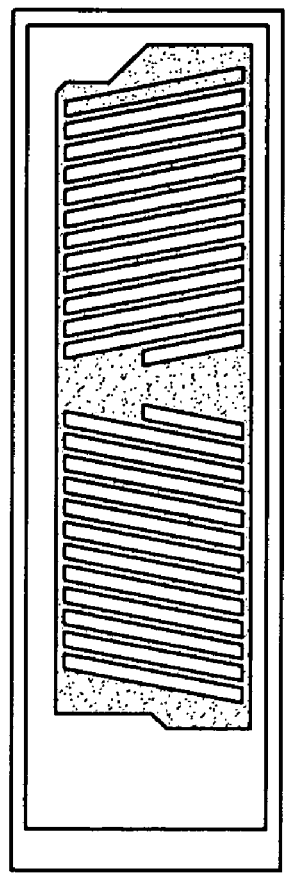

The third mask of FIG. 4C includes first openings 410 for etching the source/drain metal 350 and the active layer 340 which substantially remain at the center of the pixel area part, a second opening 420 for forming the contact hole and a third opening 430 for removing the active layer and the source/drain electrode layer overlapped with a gate metal except the TFT channel area.

Figure 3D:
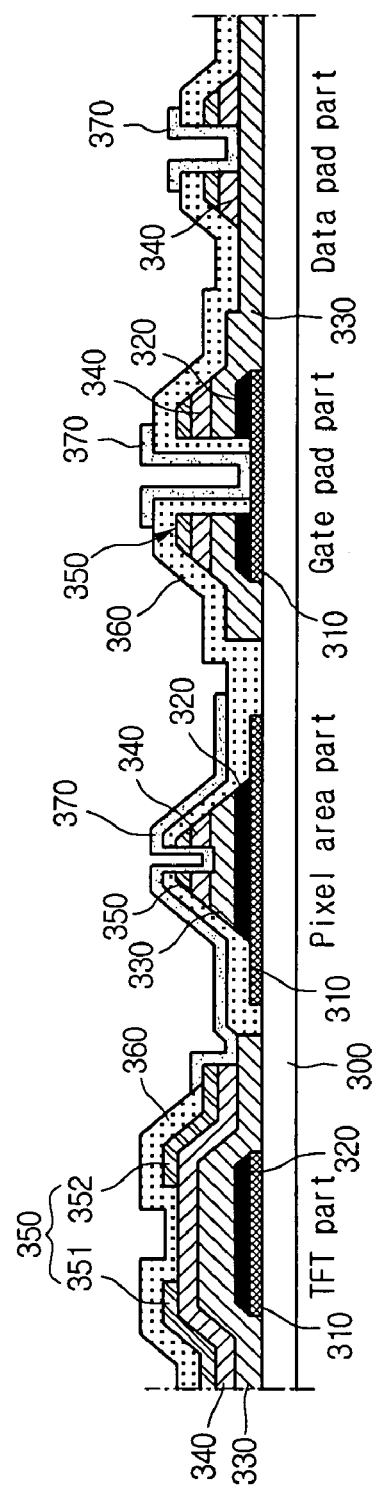

As shown in FIG. 3D, a pixel electrode 370 is deposited on the entire surface of the board 300. Then, predetermined regions of the pixel electrode 370 including a region contacting the drain electrode 352 of the TFT part, a region having the opening of the pixel area part and opened regions of the gate pad part and the data pad part are patterned through a photolithography process using a fourth mask shown in FIG. 4D.

According to the present embodiment, the pixel electrode 370 is substantially deposited on the center of the pixel area part that is etched through the first opening 410 of the third mask. Therefore, the deposited pixel electrode 370 is electrically connected to the floated source/drain metal 350 as shown in FIG. 3D.

Figure 5A:
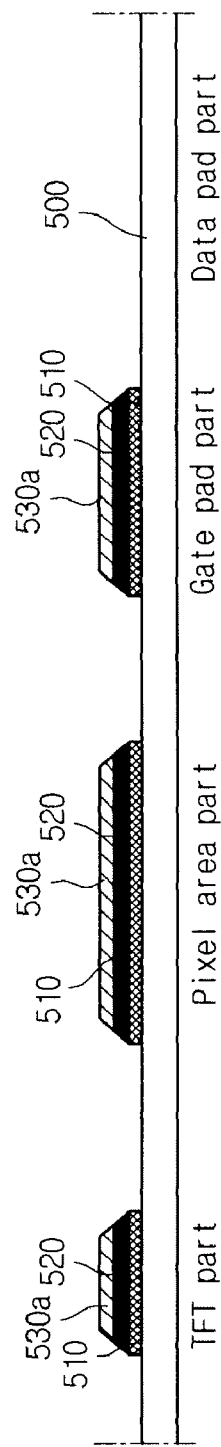
FIGS. 5A through 5D are cross-sectional views for describing a method of fabricating an FFS mode LCD according to another embodiment of the present invention.
Figure 6A:
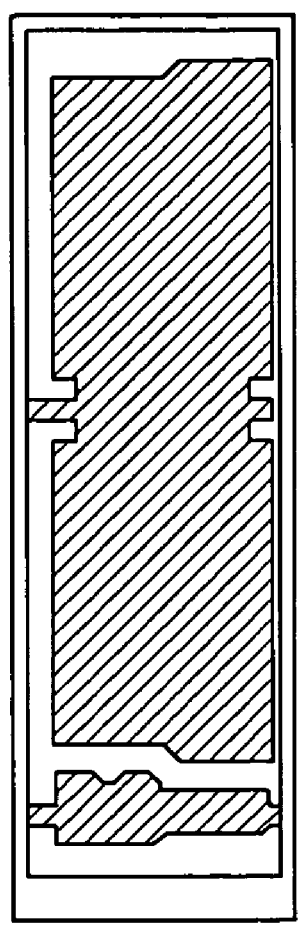
FIGS. 6A through 6D show mask patterns used for the mask processes illustrated in FIGS. 5A through 5D.
Figure 6B:
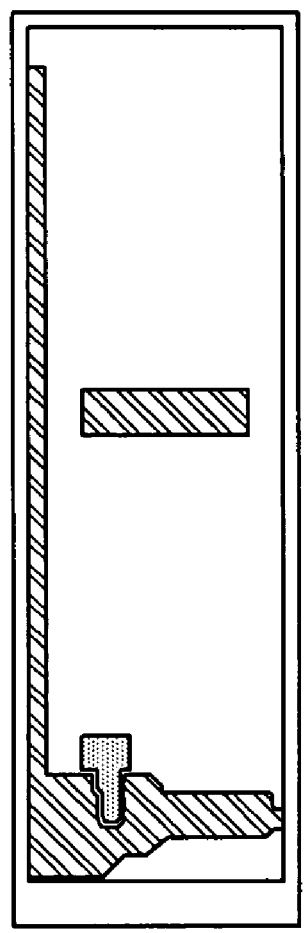

As shown in FIG. 5A, a common electrode metal 510, a gate metal 520, and a first gate insulating layer 530a are sequentially deposited on a board 500. Then, the common electrode metal 510, the gate metal 520 and the first gate insulating layer 530a are simultaneously etched through a photolithography process using a first mask having a pattern shown in FIG. 6A.

FIGS. 5A through 5D are cross-sectional views for describing a method of fabricating an FFS mode LCD according to an embodiment of the present invention, and FIGS. 6A through 6D show mask patterns used for the mask processes illustrated in FIGS. 5A through 5D.

As shown in FIG. 5A, a common electrode metal 510, a gate metal 520, and a first gate insulating layer 530a are sequentially deposited on a board 500. Then, the common electrode metal 510, the gate metal 520 and the first gate insulating layer 530a are simultaneously etched through a photolithography process using a first mask having a pattern shown in FIG. 6A.

As a result, the common electrode material 510 and the gate metal 520 are formed to be stacked on a TFT part, a pixel area part and a gate pad part.

The gate metal 520 formed on the TFT part may function as a gate line and a gate electrode, the gate metal 520 formed on the pixel area part may function as a common signal line and the gate metal 520 formed on the gate pad part may function as a bottom electrode. Also, the common electrode material 510 may be formed of a transparent material such as ITO and formed in a substantially rectangular shape.

Figure 5B:
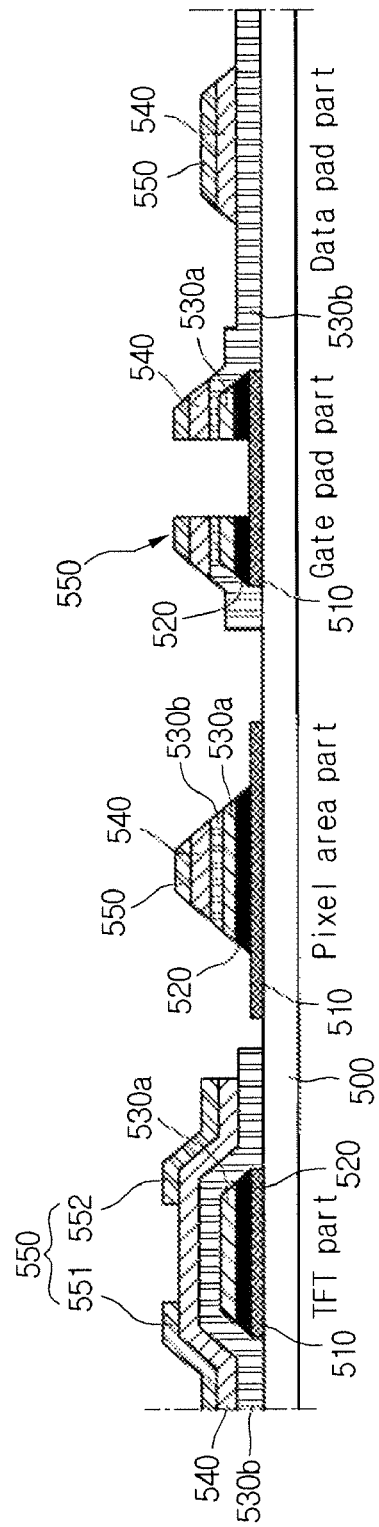

As shown in FIG. 5B, a second gate insulating layer 530b, an active layer 540 and a source/drain metal 550 are sequentially deposited on the board 500. Then, a lithography process is performed using a second mask shown in FIG. 6b to form a channel on the TFT part, to remove the gate metal from an opened region of the pixel area part and to open the gate pate part.

Also, the second gate insulating layer 530b, the active layer 540 and the source/drain metal 550 are sequentially stacked on the data pad part.

A diffraction exposure process is performed in the second mask process of the fabrication method according to the present embodiment as shown in FIG. 5B. The diffraction exposure process according to the present embodiment is performed on the channel forming area of the TFT part and the common signal line forming area of the pixel area part.

As shown in FIG. 5B, the diffraction exposure process exposes the active layer 540 in the TFT part and separates a source electrode 551 and a drain electrode 552 in the TFT part to form the channel in the TFT part. Also, the gate metal 520 substantially formed on the center portion of the pixel area part is not etched so the remaining gate metal 520 operates as a common signal line which is a patterned gate metal.

That is, the diffraction exposure process forms an opening on the pixel area part to open a common electrode, and the first gate insulating layer 530a, the second gate insulating layer 530b, the active layer 540 and the source/drain metal 550 are remained on the gate metal 520 that is operated as a common signal line.

Herein, the exposed gate metal 520 is etched using the source/drain metal 550 as a mask according to an embodiment of the present invention.

As shown in FIG. 5B, center regions of the source/drain metal 550, the active layer 540, the gate insulating layer 530 and the gate metal 520, which are substantially stacked on the gate pad part, are etched to expose a common electrode material 510 which is approximately the lowest layer in the gate pad part.

Figure 5C:
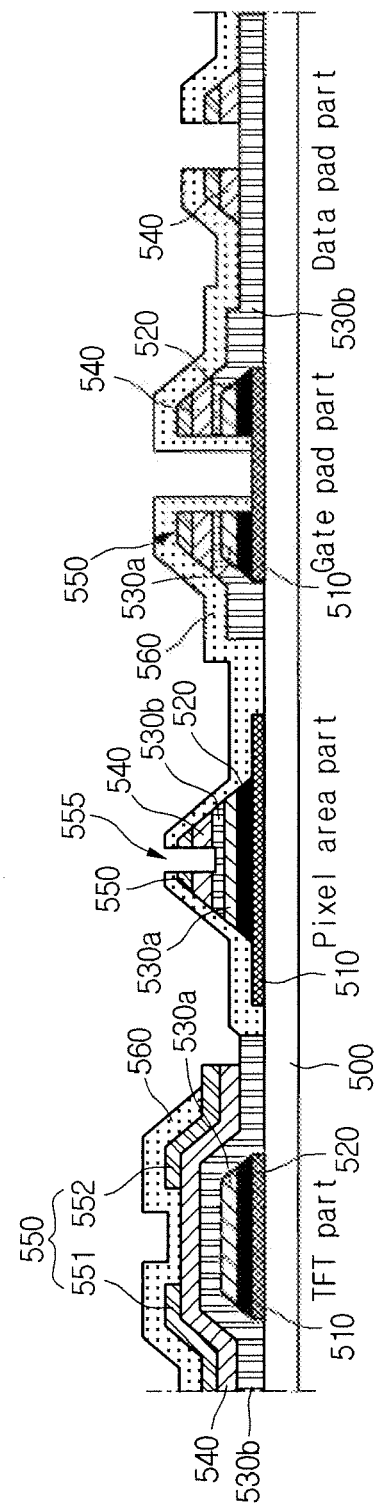

As shown in FIG. 5C, a passivation layer 560 is substantially formed on the entire surface of the board 500. Then, a photolithography process is performed using a third mask of FIG. 6C to form a contact hole on the drain electrode 552 of the TFT part and to etch a predetermined region 555 of the source/drain metal 550 and the active layer 540 which remains at the center of the pixel area part.

Figure 6C:
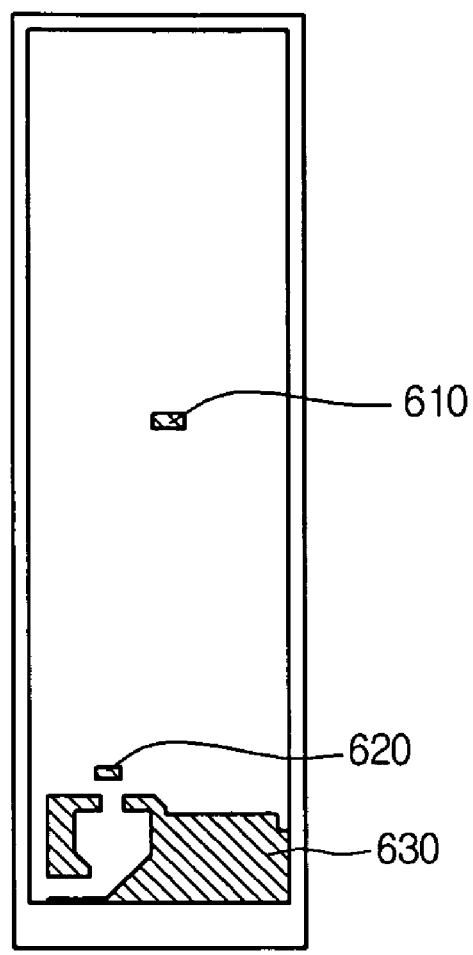
Figure 6D:
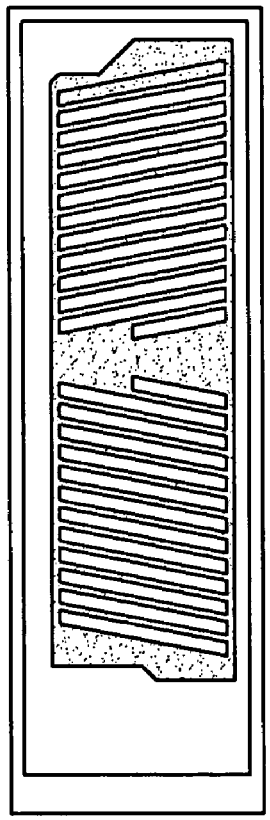

As shown in FIG. 6C, the third mask includes a first opening 610 for etching the source/drain metal 550 and the active layer 540 substantially at the center of the pixel area part, a second opening 620 for forming the contact hole, and a third opening 630 for removing the active layer 540 overlapped with the gate metal 520 and the source/drain electrode layer 550 except the TFT channel region.

Figure 5D:
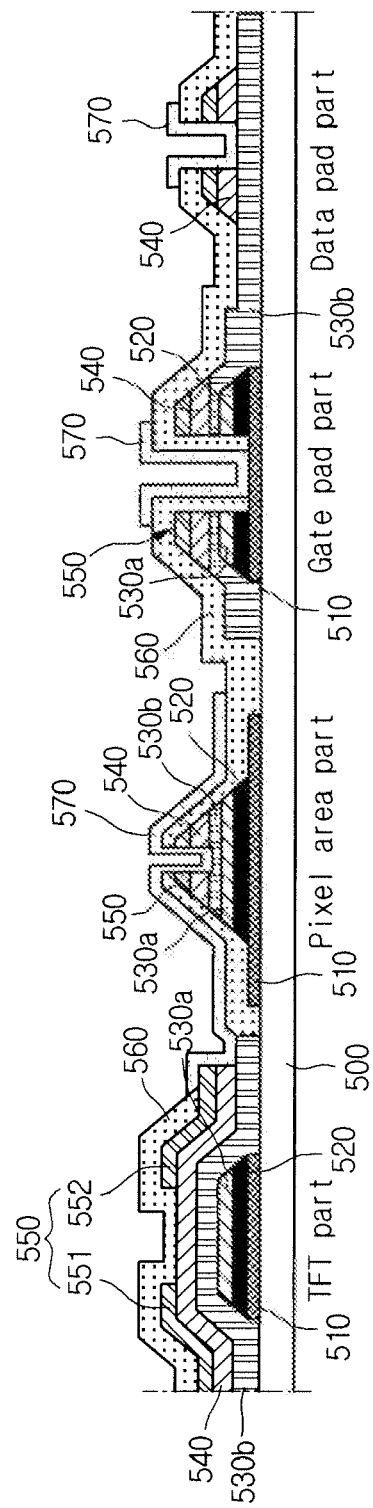

Finally, as shown in FIG. 5D, a pixel electrode 570 is deposited on the entire surface of the board 500. Then, a pixel electrode 570 is formed on predetermined regions including a region contacting the drain electrode 552 of the TFT part, a region having the opening of pixel area part, and opened regions of the gate pad part and the data pad part.

The fabrication method according to the embodiment may be characterized by depositing the pixel electrode 570 at the center of the pixel area part etched by the first opening potion 610 of the third mask. Therefore, the deposited pixel electrode 570 is electrically connected to the floated source/drain metal 550 as shown in FIG. 5D.

As described above, the four mask processes are performed to fabricate the FFS mode LCD according the embodiment. Also, the fabrication method according to the embodiment minimizes the sizes of areas for the diffraction exposure process while reducing the number of mask processes. Therefore, harmful effects which may result from diffraction exposure over large areas can be reduced.

Figure 7A:
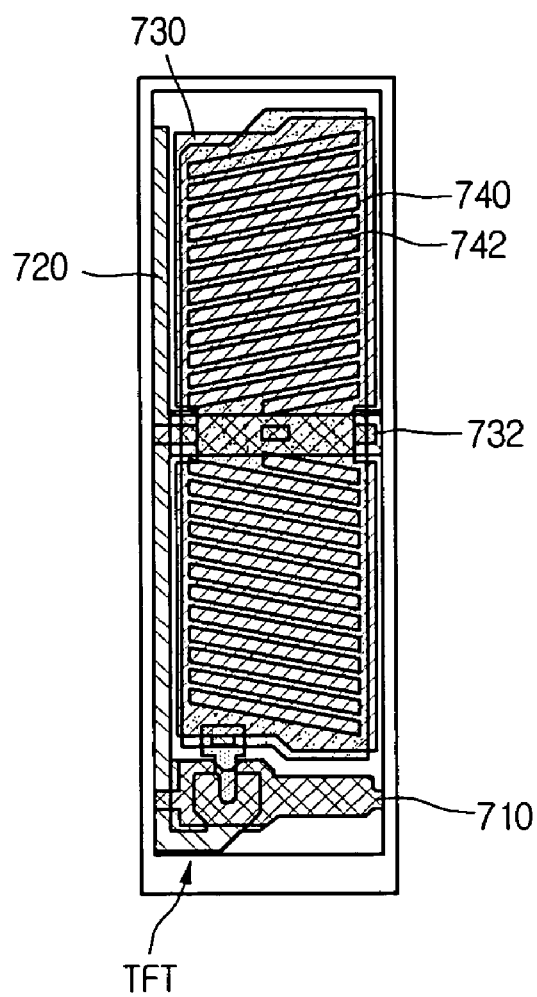
FIGS. 7A and 7B are plan views of a pixel structure of an FFS mode LCD fabricated by the methods according to the embodiments of the present invention.
Figure 7B:
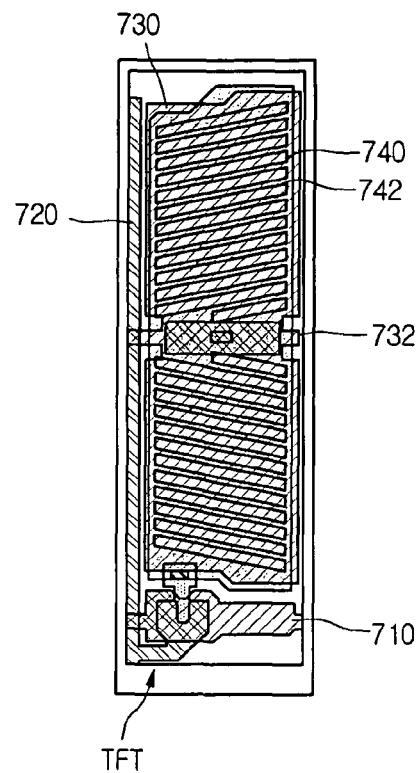
Figure 8A:
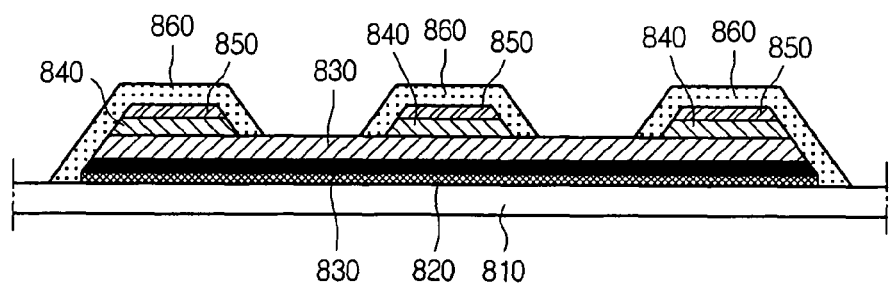
FIGS. 8A and 8B are cross-sectional views of a predetermined portion of an FFS mode LCD of FIGS. 7A and 7B.
Figure 8B:
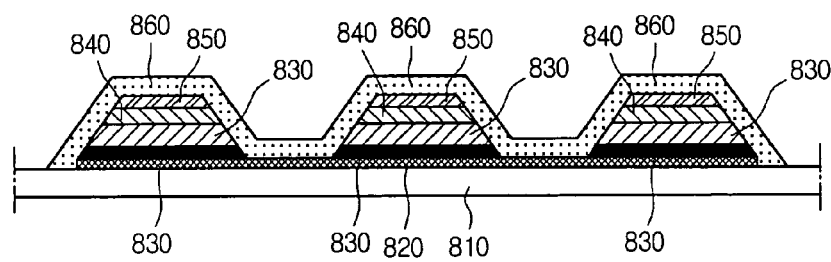

FIGS. 7A and 7B are plan views of a pixel structure of an FFS mode LCD fabricated by the methods according to embodiments of the present invention, and FIGS. 8A and 8B are cross-sectional views of a predetermined portion of an FFS mode LCD of FIGS. 7A and 7B.

In the FFS mode LCD according to an embodiment shown in FIGS. 7A and 7B, a unit pixel is defined by crossing a gate line 710 and a data line 720 on a bottom board, and a thin film transistor (TFT) is disposed at about a crossing of the gate line 710 and the data line 720.

A common electrode material 730 may be made of a transparent conductive material and formed in a substantially rectangular shape. Such a common electrode material 730 is substantially formed at each unit pixel. The common electrode material 730 is connected to the common signal line 732 and constantly receives a common signal.

A pixel electrode 740 is formed at each unit pixel to substantially overlapped with the common electrode material 730 and an insulating layer may be interposed between the overlapped pixel and common electrode materials, 740 and 730, respectively.

The pixel electrode 740 may also be formed in a substantially rectangular shape and may include a plurality of slits 742 to expose predetermined portions of the common electrode material 730.

Although not shown in the accompanying drawings, a top board is arranged to face the bottom board and to be separated from the bottom board at a distance greater than the distance between the pixel electrode 740 and the common electrode material 730. Liquid crystal is filled between the bottom board and the top board.

As shown in FIGS. 7A and 7B, the FFS mode LCD according to the present invention is characterized by a predetermined portion of the common electrode material 730 that is substantially bent toward the unit pixel side on both sides of the common signal line region.

The FFS mode LCD according to the present invention shown in FIGS. 7A and 7B is also characterized by transmitting a common electrode material signal through a common signal line or the common electrode material between adjacent unit pixels. Such a structure is illustrated in FIGS. 8A and 8B.

As shown in FIG. 8A, the FFS mode LCD according to the embodiment transmits a common electrode material signal to an adjacent pixel through a common signal line 820. As shown in FIG. 8B, the FFS mode LCD according to the embodiment transmits a common electrode material signal to an adjacent pixel through a common electrode material 810.

As described above, the four mask processes are performed to fabricate the FFS mode LCD according to the present invention. Also, the fabrication method according to the present invention minimizes areas sizes for the diffraction exposure process while reducing the number of mask processes. Therefore, harmful effects which may result from diffraction exposure over large areas can be reduced.

The fabrication method according to the present invention improves manufacturing productivity and yield for LCDs, by reducing the number of mask processes.

While the mask configurations appear as shown in the Figures, it is to be understood that various other modifications and configurations are possible without departing from the spirit and scope of the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a fringe field switching mode liquid crystal display device comprising:

forming a common electrode material and a gate metal on a board in sequence;

etching the common electrode material and the gate metal at the same time through a first mask process;

forming a gate insulating layer, an active layer and a source/drain metal on the board in sequence;

forming a channel in a thin-film transistor (TFT) part, exposing a part of the common electrode material to form an opening by etching a part of the gate metal in a pixel area part through a diffraction exposure, exposing the common electrode material by etching the gate insulating layer, the active layer and the source/drain metal in a gate pad part, and forming a data pad part stacked by the active layer and the source/drain metal by performing a second mask process using a diffraction mask, wherein the gate metal remaining on the common electrode material in the pixel area part operates as a common signal line, and the source/drain metal, the active layer and the gate insulating layer remain on the common signal line, wherein widths of the source/drain metal, the active layer and the gate insulating layer are less than a width of the common signal line;

forming a passivation layer on substantially an entire surface of the board, and forming a contact hole on a drain electrode of the TFT part, etching predetermined regions of the source/drain metal and the active layer on the common signal line at a center of the pixel area part to form a floating source/drain metal and opening the gate pad part and the data pad part through a third mask process;

forming a pixel electrode metal over the board; and forming a pixel electrode on a predetermined region contacting the drain electrode in the TFT part and a predetermined region having the opening in the pixel area part, a pixel electrode metal pattern contacted to the opened regions of the gate pad part and the data pad part by etching the pixel electrode metal through a fourth mask process, wherein a portion of a gate metal formed on the TFT part operates as a gate line and a gate electrode, and a portion of the gate metal of the gate pad part operates as a bottom electrode of a gate pad, wherein the common electrode material is disposed at the whole region of the pixel area, wherein the gate metal remaining on the common electrode material is located at the center of the pixel area and is paralleled to the gate line, and wherein the center of the etched pixel area part is connected to the floating source/drain metal by depositing the pixel electrode.

2. The method according to claim 1, wherein the diffraction exposure exposes the active layer in the TFT part and forms the channel in the TFT part by separating the source electrode and the drain electrode.

3. The method according to claim 1, wherein the diffraction exposure that forms the opening that exposes the common electrode in the pixel area part, leaves the gate insulating layer, the active layer and the source/drain metal on the gate metal that is operated as a common signal line.

4. The method according to claim 1, wherein a mask pattern used for the third mask process comprises a first opening for etching the source/drain metal and the active layer which remain on the center of the pixel area part, a second opening for forming the contact hole and a third opening for removing the active layer and the source/drain electrode layer which are overlapped with a gate metal except the channel forming area of the TFT part.

5. A fringe field switching (FFS) mode liquid crystal display device comprising:
a unit pixel defined by crossing a gate line and a data line on a first board;
a common electrode and a pixel electrode for forming a fringe field in the unit pixel;
a TFT part disposed at a position crossed with the gate line and the data line, including a source electrode connected to the data line, a drain electrode connected to the pixel electrode, and an active layer having a channel between the source and drain electrodes;
a color filter and a black matrix formed on a second board;
a liquid crystal layer interposed between the first and the second boards;
a common signal line substantially parallel to the gate line across a center of the unit pixel to include a gate metal on the common electrode for constantly receiving a common signal;
a gate pad part having a common electrode material, the gate metal and a pixel electrode metal pattern connected to the common electrode through a contact hole formed in a gate insulating layer, an active layer, a source/drain metal and a passivation layer, wherein the common electrode material is made of a transparent conductive material and the gate metal is formed directly on the common electrode material; and
a data pad part including the source/drain metal and the active layer material on the gate insulating layer and a pixel electrode metal pattern connected to a side of the source/drain metal through a contact hole formed in the passivation layer, the source/drain metal and the active layer,
wherein both sides of the common electrode corresponding to the common signal line has a predetermined portion cut inward the unit pixel, and the pixel electrode is connected to the drain electrode in a TFT part,
wherein the common electrode is disposed at the whole region of the unit pixel,
wherein the common signal line is directly contacted with the common electrode, and
wherein the source/drain metal, the active layer and the gate insulating layer are stacked on the common signal line that is the gate metal formed on the common electrode,
wherein widths of the source/drain metal, the active layer and the gate insulating layer stacked on the common signal line are less than a width of the common signal line, and
wherein the pixel electrode of the unit pixel is connected to a floating source/drain metal formed in a region of the unit pixel.

6. The FFS mode liquid crystal display device of claim 5, wherein a common electrode signal is transmitted to an adjacent unit pixel through the common signal line or the common electrode material.

7. A method of fabricating a fringe field switching (FFS) mode liquid crystal display device, the method comprising:
forming a common electrode material, a gate metal and a first gate insulating layer on a board in sequence;
etching the common electrode material, the gate metal and the first gate insulating layer through a first mask process, wherein the common electrode material, the gate metal and the first gate insulating layer are synchronously patterned;
forming a second gate insulating layer, an active layer and a source/drain metal on the board in sequence;
forming a channel in a thin-film transistor (TFT) part, exposing the common electrode material in a pixel area part by etching the gate metal, the first and the second gate insulating layers, the active layer and the source/drain metal through a diffraction exposure, and opening a gate pad part to expose the common electrode material by etching the first and second gate insulating layers, the active layer and the source/drain metal in the gate pad part and forming a data pad part stacked by the active layer and the source/drain metal through a second mask process, wherein the gate metal remaining on the common electrode in the pixel area part operates as a common signal line and the source/drain metal, the active layer and the first and second gate insulating layers remain on the common signal line, wherein widths of the source/drain metal, the active layer and the first and second gate insulating layers are less than a width of the common signal line;
forming a passivation layer substantially on the board, forming a contact hole on a drain electrode of the TFT part and etching a predetermined region of the source/ drain metal and the active layer which remain at a center of the pixel area part forming a floating source/drain metal through a third mask process; and forming a pixel electrode at a predetermined region of the TFT part that contacts the drain electrode of the TFT part, a predetermined region of the pixel area part having an opening and forming a pixel electrode material contacted to the common electrode material through the opened regions of the gate pad part and contacted to a side of the source/drain metal of the data pad part through a fourth mask process, wherein a portion of a gate metal formed on the TFT part operates as a gate line and the gate electrode, and a portion of a gate metal of the gate pad part operates as a bottom electrode of a gate pad, wherein the common electrode material is disposed at the whole region of the pixel area, wherein the gate metal remaining on the common electrode material is located at the center of the pixel area and is paralleled to the gate line, wherein the center of the etched pixel area part is connected to the floating source/drain metal by depositing the pixel electrode.

8. The method according to claim 7, wherein the diffraction exposure exposes the active layer in the TFT part and forms the channel in the TFT part by separating the source electrode and the drain electrode.

* * * * *